2,893,899
Patented July 7, 1959

2,893,899
METHOD OF FORMING A BIBULOUS COATING ON A METALLIC ANODE

Rodolfo Rodriguez Balaguer, Union de Reyes, Cuba, assignor to J. D. Hedges and Company Limited Partnership, Matanzas, Cuba, a limited partnership of Cuba No Drawing. Application May 23, 1957
Serial No. 660,998

14 Claims. (Cl. 117—230)

The present invention relates to bibulous coatings and more particularly to a method for producing such a coating on a metallic element to be used as an anode in a primary battery.

A number of materials has been employed as bibulous coatings for dry cell anode elements. For example, specially prepared paper materials have been and are still in wide use for this purpose. A bibulous coating with exceptionally desirable characteristics for use in a primary battery is starch. However, considerable difficulty has been encountered in providing suitable starch coatings on anode elements of special shapes, as a result of which paper coatings are often used for structures in which a starch coating would be preferred. For example, difficulty has been found in providing a starch coating on anode elements for the so-called "inside-out" batteries in which the anode element is inserted into the battery mix previously placed in the carbon cathode.

The present invention is concerned with the provision of starch bibulous coatings and a principal object thereof has been the provision of a novel and improved method for producing such a coating.

More particularly, it has been an object of the invention to provide a method for producing a bibulous coating of starch on a primary battery anode element, which coating has a desired uniform thickness over the surface area of the element.

An important object of the invention has been the provision of such a method in which a very thin, tough starch coating is provided.

Another object of the invention has been the provision of such a method which is susceptible of use in the modern high speed, low cost operations employed in manufacturing primary batteries.

Still another object of the invention has been the provision of such a method in which the coated anode element can conveniently be forced into place through a mass of battery mix.

A further object of the invention has been the provision of such a method which will produce a bibulous coating on the inside and outside surfaces of a cylindrical anode structure.

Other and further objects, features and advantages of the invention will appear more fully from the following description of the invention.

The method, in accordance with the invention, involves the provision of a starch solution which preferably contains a quantity of the electrolyte to be incorporated in the battery mix. The anode element, usually made of zinc, is heated to an elevated temperature and is promptly rapidly immersed in and removed from the solution. The constituents of the solution, the temperature of the solution, the temperature of the anode element, and the time of immersion are selected to provide a thin, uniform starch coating of desired thickness on the anode element.

While the invention is applicable to a wide variety of anode structures, one example of such a structure is the annular cylindrical anode construction described in my copending application Serial No. 572,085, filed March 16, 1956. The anode construction described therein, of which a number of modifications is suggested, is an excellent example of a structure on which it would be difficult if not economically impossible to provide a thin starch coating by the starch coating methods of the prior art. In accordance with the present invention a uniform, hard, thin starch bibulous coating may be produced on both the inside and outside surfaces of the anode cylinder, the production of the starch coating requiring very little time and being easily accomplished by mass production techniques.

As previously indicated, the anode element, which will generally be made of zinc but which may be made of any suitable metal, is heated and is then immersed into a starch containing solution. The constituents of the solution and their concentration may be varied over a wide range, depending upon the characteristics desired in the bibulous coating. In many cases, and particularly when the bibulous coating to be produced was a thickness greater than about $\frac{1}{64}$ inch, it will be desirable to include in the solution an electrolyte of the type to be used in the battery mix provided for the cell being produced. However, this is not essential and an aqueous starch solution may be employed. If the starch coating is to be very thin, e. g., less than about $\frac{1}{64}$ inch thick, little advantage will normally be gained by using an electrolyte solution.

Typical examples of suitable solutions will now be set forth. In each case the electrolyte can be replaced with water.

Solution #1

An electrolyte was prepared by dissolving 25 g. of ammonium chloride ($NH_4Cl$) and 10 g. of zinc chloride ($ZnCl_2$) in 60 cc. of distilled water. The solution was formed by dissolving 15 g. of wheat starch in 40 cc. of the electrolyte.

Solution #2

An electrolyte was prepared by dissolving 25 g. of ammonium chloride and 15 g. of zinc chloride in 60 cc. of distilled water. The solution was formed by dissolving 25 g. of yucca starch in 40 cc. of the electrolyte.

Solution #3

The solution was formed by dissolving 5 g. of wheat flour and 20 g. of yucca starch in 40 cc. of electrolyte prepared as in Solution #2.

Solution #4

The solution was formed by dissolving 20 g. of corn starch in 40 cc. of electrolyte prepared as in Solution #2.

The starch and starch concentration employed have a significant effect on the resulting bibulous coating. For example corn starch tends to produce a harder coating than wheat starch while yucca starch produces a harder coating than corn starch. A hard coating is desirable when the anode is to be pushed into place through a mass of battery mix during cell assembly since the hard coating will not easily be dislodged or scratched off in spots by being pushed through the battery mix. A concentrated starch solution tends to produce a thicker bibulous coating. In general a thick coating is undesirable since it will be more difficult to push through the mass of battery mix and since it will take up space which could otherwise be occupied by battery mix.

The prepared solution should be maintained at a temperature at which the starch will not gel from the heat transferred thereto from the heated anodes immersed therein. The required temperature will vary with such factors as the anode temperature, the time duration of anode immersion, the rate of anode immersion and the quantity of solution provided. The temperature of the solution should not be allowed to reach a value at which the starch will gel. This can best be prevented by cooling the solution to a suitable temperature, e.g., 10° C., and maintaining the solution at this temperature.

Before immersion in the cooled solution, the anode should be heated to a temperature at least equal to that at which a starch coating will form thereon and not greater than a temperature at which the solution will boil when in contact with the treated anode. Boiling causes bubbles to form in the coating. In general, the anode should be heated to a temperature between about 100° and 200° C. The anode, while still at a temperature in this range, should be immersed in the solution and then withdrawn. It is desirable that the temperature be uniform over the entire anode surface in order to insure a uniform coating. Complete immersion of the anode is not necessary if only a portion thereof is to be coated. Only the portion to be coated should be immersed. Insertion of the heated anode in the solution and withdrawal thereof from the solution should be effected as rapidly as possible in order to insure a coating of uniform thickness.

Immersion of the heated anode in the starch solution causes the starch in contact with the anode to gel on the surface of the anode. This gel is a hard coating which adheres closely to the metal and provides the electrically insulating porous surface desired for a primary battery anode. The gel is in the nature of a cooked or baked starch coating.

The time of immersion of the anode in the solution should be relatively short, usually between about ¼ second and 2 seconds and preferably less than about 1 second. Too long an immersion tends to produce too thick a coating which is undesirable, as observed previously. Too long an immersion time also tends to heat the electrolyte excessively. The dip time should, of course, be sufficiently long to permit a coating of sufficient thickness to be formed, but under proper conditions may be less than ¼ second.

The bibulous coating, after formation, should be dried and then kept dry until assembly of the coated anode in the primary battery because the starch will tend to absorb moisture from the atmosphere and become soft. Initial drying may be effected by placing the coated anode in a hot dry atmosphere. An oven may be used to speed drying.

While various coating thicknesses can be used, a thickness of the order of $\frac{1}{64}''$ to $\frac{1}{32}''$ will usually be satisfactory. However, a thickness of $\frac{1}{128}''$ has been successfully used. If desired, somewhat greater thicknesses may be used, e.g., $\frac{1}{16}''$ or more, but these greater thicknesses are generally undesirable because of the space taken up thereby in the battery.

When battery assembly requires the coated anode to be pushed through a mass of battery mix, it will, in most cases, be desirable to provide protection for the coated leading edges of the anode, i.e., the edges which form the opening in the mass of mix through which the remainder of the anode is pushed. The leading edges may be protected by a small piece of paper folded over the edges. Another alternative is to coat the leading edges with an insulating varnish or a suitable resin. It is desirable that the edge protection be easily applied and therefore a protective coating which can be applied by a simple dip, such as the insulating varnish, is preferred. No substantial portion of the sides of the anode structure need be protected in this way.

The solutions described previously have been formed with natural starches such as corn starch, wheat flour, wheat starch and yucca starch. There are, however, synthetic gel forming materials which will form a similar gel coating upon contact with the heated anode surface and which coating is relatively insoluble in the electrolyte used in the battery mix, i.e., the gel coating will not be dissolved upon insertion of the coated anode in the battery mix. Such synthetic gel forming materials have heretofore been used in primary battery construction either alone or in combination with starch. It has been found that the gel coating forming method of the invention is applicable to such synthetic gel forming materials, although starch is preferred for a bibulous coating. Contact of the heated anode structure with a solution containing such a synthetic gel forming material produces a suitable bibulous coating for electrical insulating and ion transfer purposes, which coating can be used in place of the starch coating previously described. Under some circumstances it will be desirable to include in the solution both starch and a synthetic gel forming material, for example, in equal quantities by weight. Some synthetic gel forming materials may not be suitable for providing a bibulous coating since they may be dissolved by the electrolyte solution contained in the battery mix. An example of a synthetic gel forming material which can be used either alone or in combination with starch, in the practice of the invention is methyl cellulose. The use of such suitable synthetic gel forming materials is intended to be included within the scope of the appended claims and it should be understood that such materials are embraced within the word starch used therein.

While the invention has been described in connection with specific examples thereof and in specific uses, various modifications thereof will occur to those skilled in the art without departing from the spirit and scope of the invention as set forth in the appended claims.

What is claimed is:

1. The method of forming a bibulous coating on a metallic anode element which is subsequently to be assembled into a primary battery, comprising the steps of forming a starch containing solution, heating said anode element to a temperature lying within the range bounded by the low temperature at which the heated anode in contact with the starch in said solution will cause said starch to gel and the temperature at which said solution will boil when in contact with said heated anode, immersing said heated anode element in said solution for a time interval just sufficient to form a gel coating of desired thickness on said anode, and maintaining said solution at a temperature at which the heat transferred thereto from said anode element is insufficient to raise the temperature of said solution, except where said solution is in contact with said anode element, to a value at which the starch in said solution will gel.

2. The method of forming a bibulous coating on a metallic anode element which is subsequently to be assembled into a primary battery, comprising the steps of forming a solution containing a quantity of starch sufficient to gel upon contact with a heated anode and a quantity of electrolyte of the type to be used in the battery mix of said primary battery, heating said anode element to a temperature lying within the range bounded by the low temperature at which the heated anode in contact with the starch in said solution will cause said starch to gel and the temperature at which said solution will boil when in contact with said heated anode, immersing said heated anode element in said solution for a time interval just sufficient to form a gel coating of desired thickness on said anode, and maintaining said solution at a temperature at which the heat transferred thereto from said anode element is insufficient to raise the temperature of said solution, except where said solution is in contact with said anode element, to a value at which the starch in said solution will gel.

3. The method set forth in claim 1 in which said time interval is within the range of about ¼ second to 2 seconds.

4. The method set forth in claim 1 in which said time interval is less than about 1 second.

5. The method set forth in claim 1 in which said solution is maintained at a reduced temperature.

6. The method set forth in claim 5 in which said reduced temperature is of the order of 10° C.

7. The method of forming a bibulous coating on a metallic anode element which is subsequently to be assembled into a primary battery, comprising the steps of forming a starch containing solution, heating said anode element to a temperature lying within the range of about 100° C. to 200° C., immersing said heated anode element in said solution for a time interval lying within the range of about ¼ second to 2 seconds, and maintaining said solution at a reduced temperature at which the heat transferred thereto from said anode element is insufficient to raise the temperature of said solution, except where said solution is in contact with said anode element, to a value at which the starch in said solution will gel.

8. The method of forming a bibulous coating on a metallic anode element which is subsequently to be assembled into a primary battery, comprising the steps of forming an electrolyte solution of the type to be used in the battery mix for said primary battery, dissolving a quantity of starch in said solution, said quantity of starch being sufficient to gel upon contact with a heated anode, heating said anode element to a temperature lying within the range of about 100° C. to 200° C., immersing said heated anode element in said starch-containing solution for a time interval sufficient to form a gel coating of desired thickness on said anode element, and maintaining said starch-containing solution at a reduced temperature at which the heat transferred thereto from said anode element is insufficient to raise the temperature of said solution, except where said solution is in contact with said anode element, to a value at which the starch in said solution will gel.

9. The method set forth in claim 8 in which said time interval is of the order of about ¼ second to 2 seconds.

10. The method set forth in claim 8 in which said time interval is less than about 1 second.

11. The method set forth in claim 8 in which said reduced temperature is of the order of 10° C.

12. The method set forth in claim 8 in which said desired thickness is less than about $\frac{1}{32}$ inch.

13. The method of forming a bibulous coating on a metallic anode element which is subsequently to be assembled into a primary battery, comprising the steps of forming a solution containing a quantity of starch sufficient to gel upon contact with a heated anode element, heating said anode element to a temperature lying within the range of about 100° C. to 200° C., immersing said heated anode element in said solution for a time interval less than about 1 second, maintaining said solution at a reduced temperature at which the heat transferred thereto from said anode element is insufficient to raise the temperature of said solution, except where said solution is in contact with said anode element, to a value at which the starch in said solution will gel, drying the gel coating formed on said anode element, and maintaining said gel coating dry until assembly thereof into said primary battery.

14. The method set forth in claim 13 in which the thicknes of said gel coating is of the order of $\frac{1}{128}$ inch or less.

References Cited in the file of this patent

UNITED STATES PATENTS

| | | |
|---|---|---|
| 2,399,127 | Lipinski | Apr. 23, 1946 |
| 2,605,299 | Teas | July 29, 1952 |